United States Patent [19]

Duve

[11] Patent Number: 4,531,016
[45] Date of Patent: Jul. 23, 1985

[54] MULTI-EDGE SPRING INSERT FOR TWIST-ON CONNECTORS

[75] Inventor: Wolfgang Duve, Hackettstown, N.J.

[73] Assignee: Amerace Corporation, Hackettstown, N.J.

[21] Appl. No.: 586,266

[22] Filed: Mar. 5, 1984

[51] Int. Cl.³ .............................................. H01R 4/12
[52] U.S. Cl. ..................................... 174/87; 267/180
[58] Field of Search ......................... 174/87; 267/180; 339/97 T

[56] References Cited

U.S. PATENT DOCUMENTS

| | | | |
|---|---|---|---|
| 2,292,236 | 8/1942 | Martin | 339/97 T |
| 3,320,355 | 5/1967 | Booker | 174/87 |
| 3,350,499 | 10/1967 | Swanson | 174/87 |
| 3,497,607 | 2/1970 | Swanson | 174/87 |
| 3,875,324 | 4/1975 | Waddington et al. | 174/87 |
| 4,035,577 | 7/1977 | Loeber | 174/87 X |
| 4,104,482 | 8/1978 | Scott | 174/87 |

Primary Examiner—A. T. Grimley
Assistant Examiner—Morris H. Nimmo
Attorney, Agent, or Firm—David Teschner

[57] ABSTRACT

Prior to coiling, the wire to be used as the spring insert of twist-on connectors is mechanically worked to form at least two relatively sharp edges. When coiling is accomplished such edges are positioned to extend inwardly into the core of such coils to mechanically engage and retain conductors placed within said core.

Similar sharp edges can be formed on spring inserts having a wide range of initial cross-section profiles.

10 Claims, 9 Drawing Figures

MULTI-EDGE SPRING INSERT FOR TWIST-ON CONNECTORS

BACKGROUND OF THE INVENTION

1. Field of the Invention

The invention is directed to the field of wire splicing and more particularly to the joining together of at least two conductors or dead-ending a single conductor without the use of special equipment or tools.

2. Description of the Prior Art

Twist-on connectors are widely used in the electrical industry for splicing solid and or stranded wires in a pigtail fashion. The twist-on connector has an external shell of a suitable non-conductive material such as plastic or rubber of such configuration that it can readily be manipulated. For example, the shell exterior surface may have a series of raised ribs or may include wings or the shell may be formed to have a non-circular external cross-section. A tapered interior passage extends from a large diameter conductor entrance to a small diameter end adjacent the closed shell end portion. Within the shell passage is positioned a spring insert formed of a tapered series of coils of wire complimentary to such passage. Provision is made to lock the final coil of the insert to the shell. In this manner the coil may be expanded to a limited degree to admit conductors within the hollow core of the coil as the connector is twisted-on to the conductors to be joined.

In early twist-on connectors the cross-section of the wire used to form the spring insert was round. As a result the conductors to be joined were contacted by the spring insert along a tangent to such round wire. Insufficient frictional engagement resulted in the separation of the connector from the conductors, allowing the conductors to separate or the joint to be exposed with its attendant dangers.

In an attempt to improve the twist-on connector and prevent unwanted separation of the connector from the wire joint, resort was had to certain non-circular cross-section wire in forming the spring inserts. One of the most commonly employed was the square or rectangular cross-section. When the insert was formed, the wire was positioned such that one of the rectangular corners extended into the coil core so that such corner could engage conductors positioned in said core. However, since it is difficult to form wire with truly sharp edges, the result is a radiused surface which only provides tangential contact with inserted conductors. Similarly, tear drop cross-section wire actually provides only a single tangential contact as well.

SUMMARY OF THE INVENTION

Wire inserts for twist-on connectors constructed in accordance with the concepts of the invention overcome the difficulties noted above with respect to wire inserts constructed in accordance with the prior art. The wire inserts of the instant invention provide at least two generally sharp edged ribs to engage the inserted conductors and mechanically hold them to prevent unwanted separation of the conductors and connector. Wire inserts of the type disclosed herein may be made from wire having various initial cross-sections such as round, square, rectangular or teardrop. It is an object of this invention to provide an improved spring insert for a twist-on connector.

It is an object of this invention to provide an improved spring insert for a twist-on connector having increased mechanical grip on conductors inserted therein.

It is a further object of this invention to provide an improved spring insert for a twist-on connector having at least two generally sharp edged ribs formed by mechanically distorting the wire stock to be used to form the insert.

Other objects and features of the invention will be pointed out in the following descriptions and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characteristics.

DESCRIPTION OF THE PREFERRED EMBODIMENTS

Figure 1:
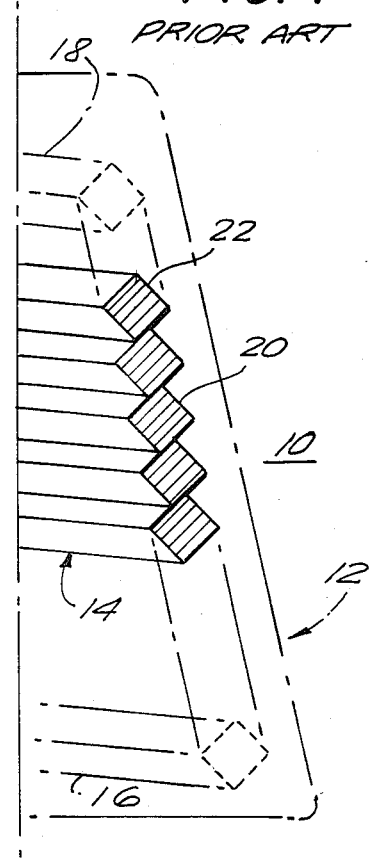
FIG. 1 is a front elevation of a portion of a spring insert, in section, constructed according to prior art techniques and with the external shell shown in phantom line so as not to occlude the details of the spring insert.
Figure 2:
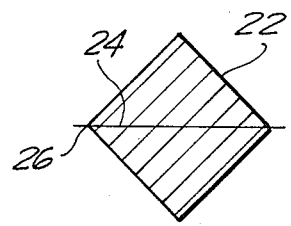
FIG. 2 is a sectional view, greatly enlarged, of known square wire employed to form the wire insert of FIG. 1.

Turning now to FIGS. 1 and 2 there is shown a twist-on connector 10 having an external shell 12 constructed of a suitable dielectric material such as plastic or rubber and shown in phantom line to prevent occulusion of the details of the spring insert 14 therein. The spring insert 14 is tapered from its large conductor entry end 16 to its smaller diameter end 18 adjacent the closed end of the shell 12. The spring insert 14 is formed of a plurality of turns 20 of a square cross-section wire 22 with each succeeding turn slightly overlapped. The wire 22, is coiled so that a diagonal 24 of the square extends generally perpendicular to the longitudial axis of the insert 14. Although edge 26 is shown as square, it rarely is so. Square wire 22 is often formed from round wire and the corners are generally rounded giving only a small tangential point of contact between the edge 26 of square wire 22 and conductors placed therein.

Figure 3:
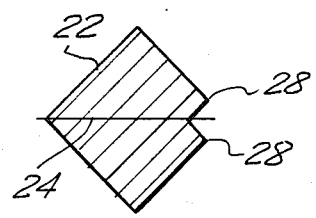
FIG. 3 is a sectional view, greatly enlarged, of the square wire of FIG. 2 modified according to the concepts of the invention.

FIG. 3 shows how the square wire 22 is modified according to the concepts of the present invention.

Figure 9:
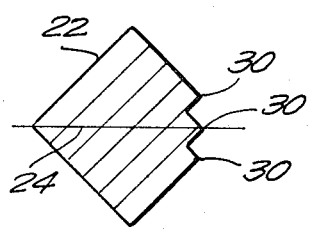
FIG. 9 is a sectional view, greatly enlarged, of the square wire of FIG. 2 modified according to the concepts of the invention.

Wire 22 is placed in a suitable support die and a die having a sharp V-edge is used to engage the square wire 22 along diagonal 24 to form two sharp ribs 28 adjacent the diagonal 24. Alternately, as is shown in FIG. 9, three sharp ribs 30 may be formed in square wire 22 employing a suitable die striking wire 22 along diagonal 24.

Figure 4:
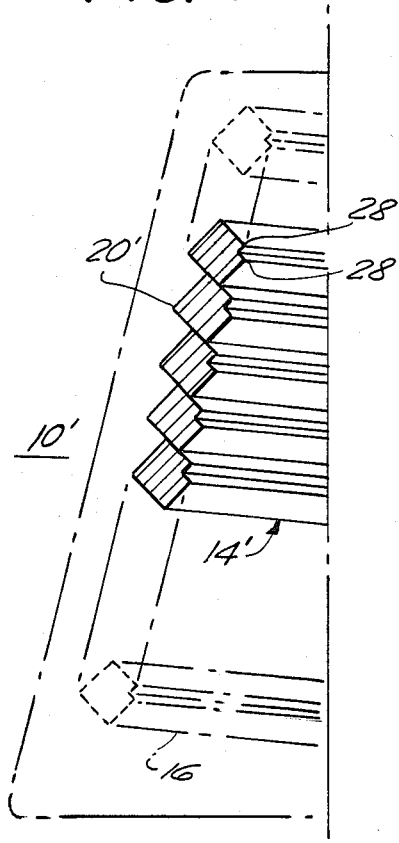
FIG. 4 is a front elevation of a portion of a spring insert, in section, constructed in accordance with the concepts of the invention and with the external shell shown in phantom line so as not to occlude the details of the spring insert.

As shown in FIG. 4 insert 14' presents at each coil turn 20' two sharp edges 28 which will engage the conductors placed therein. Because of the sharp edges 28 wipe along the conductor outer surfaces and provide for good mechanical contact with such conductors to prevent separation of twist-on connector 10' therefrom.

Figure 5:
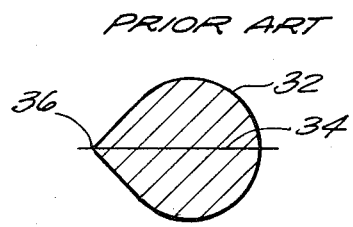
FIG. 5 is a sectional view, greatly enlarged, of tear-drop shaped wire known in the prior art.
Figure 6:
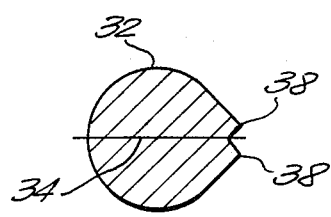
FIG. 6 is a sectional view, greatly enlarged, of the tear-drop wire of FIG. 5 modified according to the concepts of the invention.
Figure 7:
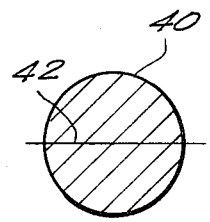
FIG. 7 is a sectional view, greatly enlarged, of round shaped wire known in the prior art.
Figure 8:
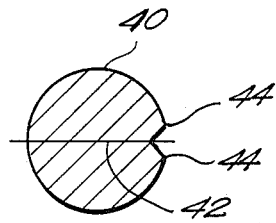
FIG. 8 is a sectional view, greatly enlarged, of the round wire of FIG. 7 modified according to the concepts of the invention.

Wire 32 having a generally tear-drop shape and a point 36 along axis 34, as is shown in FIG. 5 can be modified as shown in FIG. 6 to provide two sharp ribs 38 adjacent axis 34. Similarly round wire 40, as shown in FIG. 7, can be modified by a suitable die striking wire 40 along diameter 42 to provide two sharp ribs 44. Spring inserts can be formed from the modified wires 32 and 40. Additionally any wire which can be modified to provide at least two sharp ribs can be employed.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or priviledge is claimed are defined as follows:

1. In a twist-on connector for engaging at least one electrical conductor, having an external insulating shell and a coiled wire spring insert comprising a plurality of turns of wire providing a hollow core therein for the receipt of at least one electrical conductor, the improvement comprising at least two continuous sharp edged ribs formed on each turn and extending along substantially the entire turn of said coiled wire spring insert, said ribs extending into said hollow core of said insert to engage and mechanically hold electrical conductors inserted therein.

2. The twist-on connector as defined in claim 1, wherein the wire forming said coiled wire spring insert has a square cross-section and is wound to present a diagonal thereof generally perpendicular to the longitudial axis of said connector.

3. The twist-on connector as defined in claim 2, wherein said two sharp edged ribs are formed adjacent said diagonal of said square wire.

4. The twist-on connector as defined in claim 1, wherein said coiled wire spring insert has three sharp edged ribs formed thereon.

5. The twist-on connector as defined in claim 4, wherein the wire forming said coiled wire spring insert has a square cross-section and is wound to present a diagonal thereof generally perpendicular to the longitudinal axis of said connector.

6. The twist-on connector as defined in claim 5, wherein said three sharp edged ribs are formed symetrically about said diagonal of said square wire.

7. The twist-on connector as defined in claim 1, wherein the wire forming said coiled wire spring insert has a tear-drop shaped cross-section and is wound to present its major axis generally perpendicular to the longitudial axis of said connector.

8. The twist-on connector as defined in claim 7, wherein said two sharp edged ribs are formed adjacent the major axis of said tear-drop shaped wire.

9. The twist-on connector as defined in claim 1, wherein the wire forming said coiled wire spring insert has a circular cross-section and is wound to present a predetermined diameter generally perpendicular to the logitudinal axis of said connector.

10. The twist-on connector as defined in claim 9, wherein said two sharp edged ribs are formed adjacent said predetermined diameter of said circular cross-section wire.

* * * * *